UNITED STATES PATENT OFFICE.

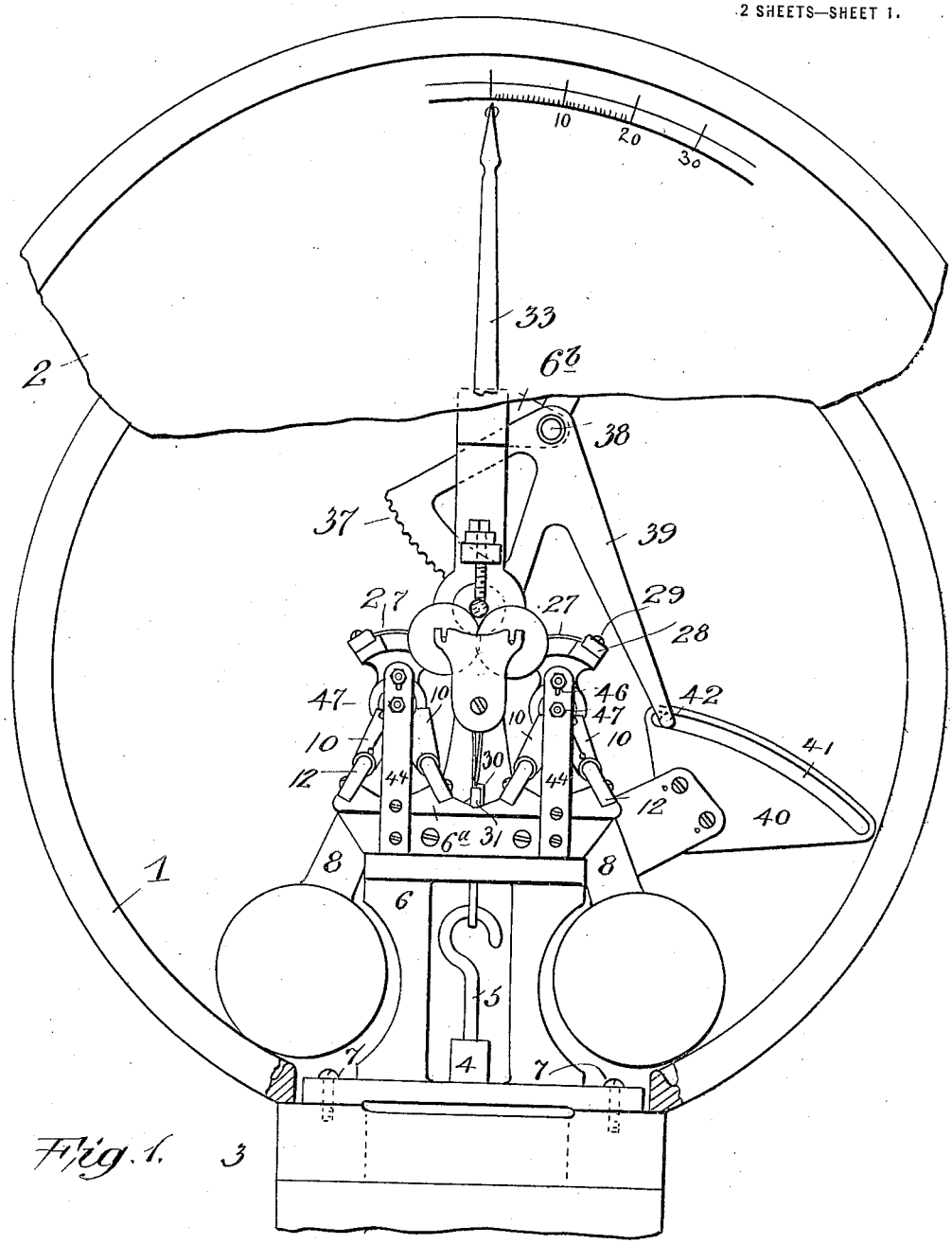

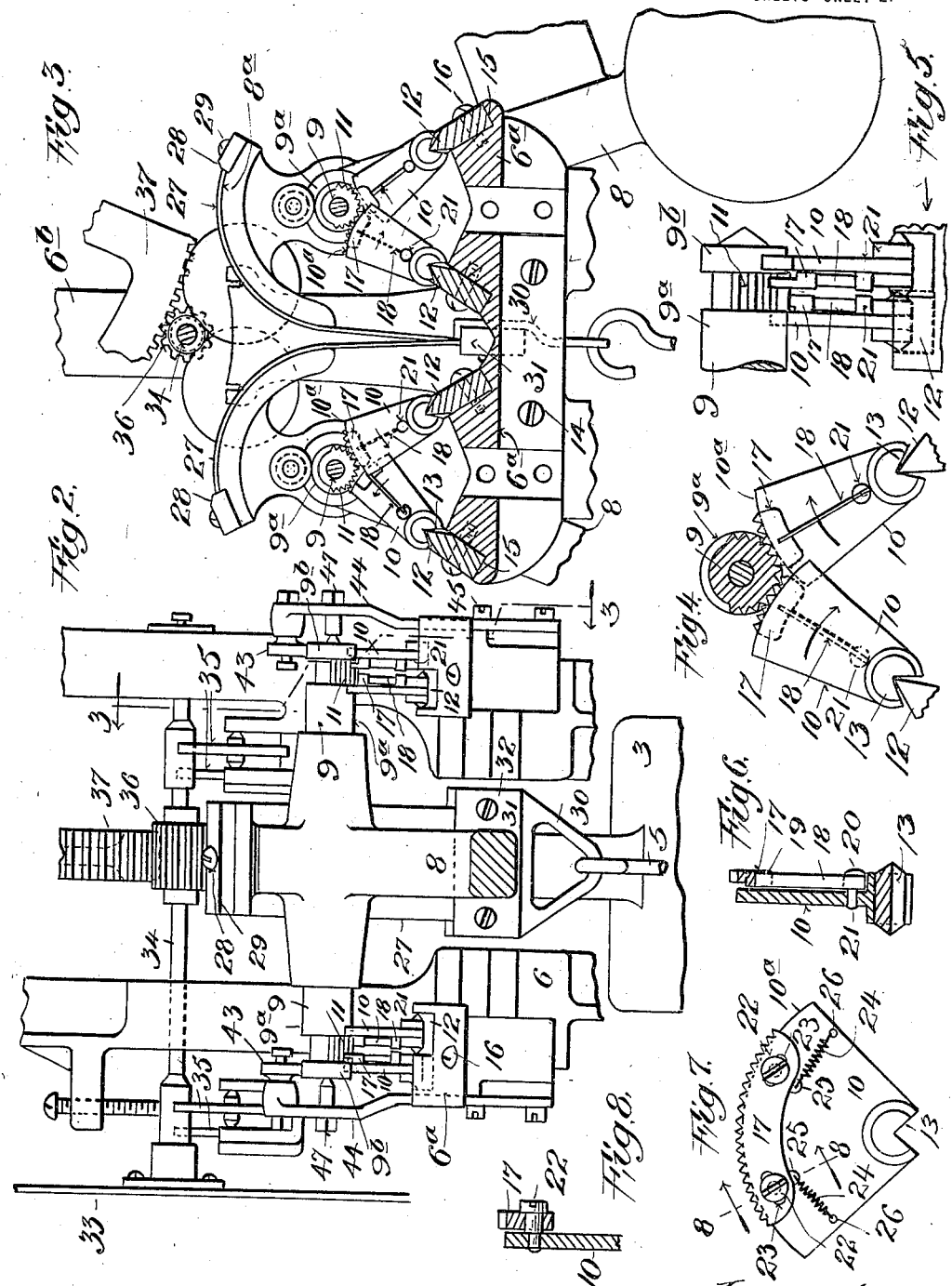

JOSEPH C. BARRETT, OF BROOKLYN, NEW YORK.

ROCKER-BEARING FOR MEASURING INSTRUMENTS.

1,310,464.   Specification of Letters Patent.   Patented July 22, 1919.

Application filed February 21, 1917, Serial No. 149,995.   Renewed December 17, 1918.   Serial No. 267,208.

*To all whom it may concern:*

Be it known that I, JOSEPH C. BARRETT, a citizen of the United States, and resident of New York city, borough of Brooklyn, in the county of Kings and State of New York, have invented certain new and useful Improvements in Rocker-Bearings for Measuring Instruments, of which the following is a specification.

Some measuring instruments, such as weighing scales, comprise one or more levers or weighted arms having pivots supported for rocking movement upon movable members which in turn are freely supported by or upon knife edges, and there is liability that such members will be displaced from their correct relation to such pivots by reason of shocks or jars, or by reason of the creeping of such members with relation to the pivots as the pivots roll on the members, thereby interfering with accurate weighing.

The object of my invention is to provide means that will permit the members to have free movement with respect to each other and to the pivots thereon, to reduce liability of crowding or friction between the coacting surfaces of the members and pivots, and yet will cause the correct return of the members with relation to the pivots if such members should be displaced from such relation, as by reason of shocks or jars or by creeping of their coacting surfaces, whereby to assure that the pointer or indicator of the scale will return to the zero position, and to prevent incorrect indication of the weight of articles being weighed.

In carrying out my invention I provide one or more levers or weighted arms having pivots, movable members supporting said pivots, and teeth carried by said members and pivots for coaction, the teeth carried by said members being movable relatively thereto and connected therewith by resilient means tending to maintain said members in the correct positions relatively to the corresponding pivots, whereby if a member should move or be moved from its correct relation to the corresponding pivot said resilient means will serve to restore such member to its correct relation to the corresponding pivot, and such teeth of the members having resilient connection thereto will afford freedom of movement between such teeth and the teeth of the pivots to prevent crowding or jamming of the teeth.

My invention comprises novel details of improvement and combinations of parts that will be more fully hereinafter set forth and then pointed out in the claims.

Reference is to be had to the accompanying drawings forming part hereof, wherein;

Figure 1 is a front elevation of a portion of a scale mechanism equipped with my improvements, part being omitted;

Fig. 2 is a side view of a portion of a scale mechanism, parts being omitted;

Fig. 3 is a section substantially on the line 3, 3, in Fig. 2;

Fig. 4 is an enlarged detail illustrating the toothed portion of one of the pivots and a pair of members coöperative with the pivot;

Fig. 5 is a side view of Fig. 4;

Fig. 6 is a central section through one of the supporting members;

Fig. 7 is a detail of one of the supporting members embodying a modification, and Fig. 8 is a detail section on the line 8, 8, in Fig. 7.

Similar numerals of reference indicate corresponding parts in the several views.

I have illustrated my improvements embodied in a scale mechanism provided with a movable indicator or pointer adapted to sweep over a dial and operated from one or more levers or weighted arms in turn operated from a platform, pan or the like. 1 have shown a casing 1 and a dial 2 which may be connected in any well-known manner, said casing being shown provided with a standard or upright 3 that may be supported from or in connection with a scale platform in any suitable manner, which platform may be provided with usual equalizing levers or the like. A draft rod indicated at 4 is shown provided with a hook 5, which draft rod is adapted to be connected with the platform mechanism or with a scale pan or any other weighing device. At 6 is indicated a suitable frame within casing 1, and said parts may be secured together by screws or bolts 7 in an ordinary manner. A weighted lever or arm is indicated at 8 which is adapted for connection with the draft mechanism and is provided with pivots 9 between the ends of the respective lever or arm. I have illustrated two such levers or arms, and since a weighing mechanism may be provided with one or more of such levers or arms and parts coactive therewith a description of one will be sufficient for both. The laterally disposed pivots or gudgeons 9 are respectively supported upon corresponding pairs of spaced movable members 10 shown having correspondingly curved upper surfaces 10ª upon which the curved surfaces 9ª, 9ᵇ of pivots or gudgeons 9 are adapted to roll, said surfaces being shown spaced apart and provided therebetween with teeth 11, as in the form of a pinion. The members 10 are delicately supported to rock with relation to pivots 9, and are shown arranged in pairs spaced apart in lapped relation to respectively support the surfaces 9ª, 9ᵇ of the corresponding pivots. I have illustrated the members 10 as supported upon knife edges 12, which enter V-like or angular recesses 13 in the under sides of said members, whereby the members are delicately supported by rocking movements. The knife edges 12 are shown supported upon blocks 6ª secured upon frame 6, as by screws 14, the knife edges being shown secured in recesses 15 of blocks 6ª by screws 16 passing through the blocks and entering the brackets. As illustrated, the apices of the corresponding recesses of members 10 receive the knife edge supports 12, and said knife edges are shown so located that planes passing through the apices or sharpened ends of the knife edges coincide at the axes of the pivots or gudgeons 9 of lever 8, and the apices of the recesses 13 also lie in such corresponding planes. By such an arrangement of parts the weight of and that imposed upon lever 8 is transmitted to the corresponding members 10 and the underlying knife edges along or in the direction of such planes from the points on the peripheries of the pivots 9 where they touch the peripheries of the corresponding members 10 in such planes, whereby direct thrust of the weight is imposed through members 10 upon the knife edges in any position of said members. The members are thus delicately, yet positively, supported to rock or oscillate upon the knife edges with minimum of friction in either direction of movement of such members, as caused by the rotation of the pivots or gudgeons in contact therewith, in varying positions in which the lever 8 may be tilted by reason of the load upon the platform or scale pan through the draft mechanism connected with the lever. The construction also affords protection against the accumulation of dust or other foreign matter between the members 10 and their supports 12 and it is thus further advantageous and beneficial as avoiding a tendency to detract from the accuracy of action of the scale mechanism, and is superior to the support of weighted levers in a scale mechanism upon rollers upon ordinary annular bearings which are adapted to accumulate dust and foreign substances, as well as oil, and thereby detract from the accuracy of the scale from time to time. The members 10 are shown disconnected from one another so that one will not influence the action of the other. Said members 10 are shown having connection with the corresponding pivot or gudgeon 9 through coacting teeth, certain of such teeth being connected with a corresponding member in a resilient manner, to cause such teeth and corresponding members to tend to retain a correct relation to one another. I have shown toothed racks 17 for each member movably connected therewith and in mesh with the pinion teeth 11 of the corresponding pivot 9. In the form shown in Figs. 1 to 6 the racks 17 are supported by springs 18, which are shown supported by the corresponding member 10 and extend diametrically thereof to the corresponding rack. As a convenient means of attaching said springs to said members and racks I have shown the springs entered and secured in slots 19 in the under surfaces of the racks, and also secured in slots 20 in pins 21 that are secured to the members 10. The springs 18 are shown in the form of suitable strips or tongues, whereby the racks are supported flexibly and resiliently with respect to the surfaces 10ª of members 10, and are by said springs normally retained in and restored to correct relation to said members. Said racks are shown located in the space between the corresponding pairs of members 10, and the teeth of said racks have such relation to the surfaces 10ª of said members as to properly mesh with the pinion teeth 11 of pivots 9. The relation of the parts is such that when the pivots roll on members 10 the latter will be correspondingly rocked by the pivots and pinion teeth 11 and the rack teeth 17 will properly coact, yet if member 10 should move or be moved unduly with respect to its correct relation to the corresponding pivot 9, the corresponding spring 18 will be put under tension, serving to cause a proper restoration of its corresponding member 10 with respect to its pivot 9 in case the pivot should be displaced from such member as by reason of jars or shocks to the parts.

Instead of supporting the rack 17 upon member 10 by means of a leaf or tongue-like spring 18, as before described, such rack may be otherwise movably supported upon its member 10, and be retained in or restored to its correct relation to said member by one or more springs connecting such parts. In Figs. 7 and 8 I have shown rack 17 as slidably supported upon member 10 by means of shoulder screws 22 entering slots 23 in the rack and secured as by threads to member 10, whereby the rack and member 10 may rock relatively one to another. At 24 are springs, shown in the form of coiled springs, at opposite ends of rack 17 and respectively secured to said rack at 25, as by pins or holes on or in said rack, the opposite ends of said springs being shown secured to member 10 by pins 26 therein. Said springs will tend to retain the rack in correct relation to the corresponding member 10 and to restore such member to its correct relation to the corresponding pivot 9 in case such member may have moved from such position, in manner described with respect to rack 17 and spring 18.

The resilient connection of the rack teeth 17 with the corresponding member 10 has the further advantage of enabling such teeth to coact with the teeth 11 of the corresponding pivot in an easy, flexible or resilient manner, to prevent crowding or jamming of said teeth and to resist the tendency of said teeth to ride forcibly upon or against one another, whereby freedom of movement of members 10 with respect to pivots 9 is not obstructed or resisted by such teeth, and the coacting teeth will be caused to remain resiliently and snugly in engagement in different positions of movement of said parts to avoid backlash or loss of correct relation therebetween. The springs may have such strength as to tend to resist creeping of the members 10 respecting the pivots 9. The means described not only serves to retain the parts in correct operative relation to the pivots 9, but also has the effect of causing said pivots readily to return to the zero position, to avoid inaccuracies in weighing, and to cause the indicator or pointer connected with the lever or arm 8 to resume its correct zero position after each weighing operation. One of the advantages of the resilient connection of teeth 17 with members 10 is that the pivots 9 will be relieved from stress with regard to the rack teeth, when the parts 9, 10 and 17 are in their correct positions at zero. The coacting teeth may be made with suitable clearance at the pitch lines, and yet their movement with relation to one another will be easy and if undesired displacement or creeping of members 10 with respect to pivots 9 occurs allowance will be afforded therefor by reason of the resilient connection of the racks 17 with members 10, so as not to present undue strain between such parts, and whereby the tension thereby caused in spring 18 to one side or another will have the effect to cause the corresponding member 10 to automatically return to its correct relation to the rack and corresponding pivot 9 at any time that such pivot is relieved from pressure upon such member, as by a shock or jar.

The arrangements described are important in the class of scale mechanisms set forth, since friction that may arise between a member 10 and the corresponding pivot by reason of any displacement of their correct relation one to another, which may be sufficient to cause inaccurate indication of the weight of an article being weighed, is reduced to a minimum, and creeping of a member 10 from its correct position to such position as would cause a side of its V-like recess to engage a side of the corresponding knife edge, which would cause skidding or sliding of pivot 9 on the corresponding surface $10^a$, is avoided, since member 10 will always seek to return to its correct relation to its rack 17 and pivot 9.

Levers 8 may be connected with the draft mechanism in any suitable manner for causing rocking of said levers. I have shown the upper ends of levers 8 provided with curved surfaces $8^a$ in a well known manner, over which flexible connections 27 pass, the upper ends of which connections are shown attached to levers 8 by means of blocks 28 and screws 29, the lower ends of the connections 27 being shown attached to a loop 30 by means of block 31 and screws 32. When weight is applied upon the scale platform, pan, or the like, the flexible connections 27 will pull upon levers 8 to tilt them and their pivots 9 will roll upon the movable members 10, as before described. If a single lever 8 is provided in the scale a single connection 9 therefrom to the draft mechanism will suffice.

Any suitable means may be operated by means of a lever 8 to indicate the weight of the article being weighed. I have shown an indicator in the form of a pointer 33 adapted to sweep over the scale 2, in an ordinary manner, said pointer being carried by a shaft 34 shown journaled on suitable bearings comprising rollers 35 journaled upon frame 6. Shaft 34 is shown provided with a pinion 36 in mesh with a rack 37 journaled at 38 upon an upright $6^b$ from frame 6, an arm 39 connected with rack 37 being shown adapted to be operated by an actuator 40, shown provided with a cam-like slot 41 receiving the projection or roller 42 carried by arm 39, whereby as lever 8 rocks, the rack 37 will be rocked to cause operation of pinion 36, shaft 34 and pointer 33, since when lever 8 is rocked by the weight of the article being weighed, arm 39 will be moved to cause required operation of the pointer. At 43 are shown rollers located over corresponding pivots 9, and pivotally carried by the arms 44 secured upon frame 6, by screws 45, which rollers may be adjustable in slots 46 in the arms 44. Rollers 43 may be adjusted and retained in desired close relation to pivots 9 either in contact therewith, or just out of contact therewith, and serve to limit the rise of said pivots, and provide freedom of rocking movement for said pivots in case they should rise from the members 10, whereby injury to the pivots 9 will be prevented. In case shocks or jars occur during the weighing operation, as when an article is suddenly deposited or thrown upon the scale platform, pan or the like, the pivots 9 might tend to rise from the members 10, yet said pivots may still rotate freely under the rollers 43 as operated by the draft mechanism. Screws 47 carried by arms 44 oppose the ends of pivots 9 to limit their longitudinal movement.

My improvements afford a simple and efficient means for supporting levers or weighted arms in scale mechanisms to permit them to operate in a most frictionless manner, and without undue resistance from the members on which they roll, with the added advantage of causing such members to always tend to seek and return to their correct position with respect to said pivots, to overcome the tendency of such members to move too far from such positions during operation, whereby to assure continued accurate indication of the weight of articles being weighed, and to always indicate the zero position on the indicator for the commencement of weighing operations.

Having now described my invention what I claim is:—

1. A measuring instrument comprising a lever having pivots, movable members adapted to support said pivots, means movably supporting said members, and tension-controlled means coöperative between said pivots and members to cause said members to automatically return to correct relation to the corresponding pivots in case said members are displaced therefrom.

2. A measuring instrument comprising a lever having pivots, movable members adapted to support said pivots, means movably supporting said members, and spring-acting means interposed between said members and pivots to retain said members and pivots in correct relation and to restore them to such relation if displaced therefrom.

3. A measuring instrument comprising a lever having pivots, movable members adapted to support said pivots, means movably supporting said members, and coöperating teeth between said members and pivots, certain of said teeth having movement relatively to the members, and spring-acting means tending to retain said teeth in correct relation to the corresponding members.

4. A measuring instrument comprising a lever having pivots, said pivots having teeth, movable members adapted to support said pivots, means movably supporting said members, said members having teeth supported movably with respect to the members and in mesh with the first named teeth, and spring-acting means interposed between said members and their teeth to cause the members to retain or seek their correct positions with respect to the pivots.

5. A measuring instrument comprising a lever having pivots, said pivots having teeth, movable members adapted to support said pivots, means movably supporting said members, teeth associated with said members and in mesh with the teeth of the corresponding pivot, and springs carried by said members and supporting their corresponding teeth movably relatively thereto.

6. A measuring instrument comprising a lever having pivots, said pivots having teeth, movable members adapted to support said pivots, means movably supporting said members, teeth associated with said members and in mesh with the teeth of the corresponding pivot, and springs respectively secured to said members and extending radially thereof and carrying the corresponding teeth in mesh with the teeth of the corresponding pivot.

7. A measuring instrument comprising a lever having pivots provided with bearing portions and with teeth, movable members having bearing surfaces to coact with the bearing portions of said pivots, means movably supporting said members, teeth movable independently of said members and coöperative with the teeth of the corresponding pivots, and spring-acting means between the members and their corresponding teeth tending to retain said teeth in correct relation to the corresponding members.

8. A measuring instrument comprising a lever having pivots provided with bearing portions and with teeth, movable members having bearing surfaces to coact with the bearing portions of said pivots, means movably supporting said members, teeth movable independently of said members and coöperative with the teeth of the corresponding pivots, and spring means supporting the corresponding teeth upon said members for movement relatively thereto.

9. A measuring instrument comprising a lever having pivots provided with bearing portions and with teeth, movable members having bearing surfaces to coact with the bearing portions of said pivots, means movably supporting said members, teeth movable independently of said members and coöperative with the teeth of the corresponding pivots, and springs secured to said members and extending radially thereof and carrying the corresponding teeth in mesh with the teeth of the corresponding pivot.

10. A measuring instrument comprising a lever having pivots provided with spaced bearing portions and having teeth between said bearing portions, movable members having bearing surfaces adapted to support the bearing portions of the pivots, toothed racks located adjacent to the bearing portions of the members, means movably supporting the racks upon said members in mesh with the teeth of the corresponding pivot including spring acting means between the racks and corresponding members tending to retain the racks in correct relation to the members.

11. A measuring instrument comprising a lever having pivots provided with spaced bearing portions and having teeth between said bearing portions, movable members having bearing surfaces adapted to support the bearing portions of the pivots, toothed racks located adjacent to the bearing portions of the members, and springs carried by said members and movably supporting said racks thereon in coaction with the teeth of the corresponding pivot.

Signed at New York city, in the county of New York and State of New York this 19th day of February, A. D., 1917.

JOSEPH C. BARRETT.

Witnesses:
T. F. BOURNE,
MARIE F. WAINRIGHT.

Copies of this patent may be obtained for five cents each, by addressing the "Commissioner of Patents, Washington, D. C."